3,320,320
PROCESS FOR PRODUCING DIMETHOXY-
HEXANITROBIPHENYL AND DIAMINO
HEXANITROBIPHENYL
Mortimer J. Kamlet, Silver Spring, Md., and Darrell V. Sickman, Washington, D.C., assignors to the United States of America as represented by the Secretary of the Navy
No Drawing. Filed May 26, 1965, Ser. No. 459,130
9 Claims. (Cl. 260—581)

The invention described herein may be manufactured and used by or for the Government of the United States of America for governmental purposes without the payment of any royalties thereon or therefor.

This invention pertains to a new and improved process for producing 3,3' - diamino - 2,2',4,4',6,6' - hexanitrobiphenyl (DIPAM) via the intermediate 3,3'-dimethoxy-2,2',4,4',6,6'-hexanitrobiphenyl and to a novel process for producing said intermediate.

DIPAM is currently produced by the following process:

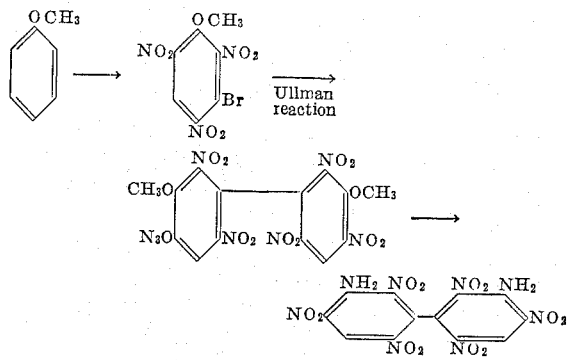

Although this process produces DIPAM in good yields the high cost of the starting material and the difficulties inherent in running an Ullman reaction make the large scale production of DIPAM very costly.

Accordingly it is an object of this invention to provide a new process for producing DIPAM.

Another object is to produce DIPAM through an intermediate that is produced by a novel process.

A further object is to provide an improved process for producing a high grade of DIPAM.

Still another object is to produce DIPAM in high yields at a low cost.

These objects as well as many others will become more readily apparent to those skilled in the art upon reading the following specification.

The overall reaction scheme of this invention is:

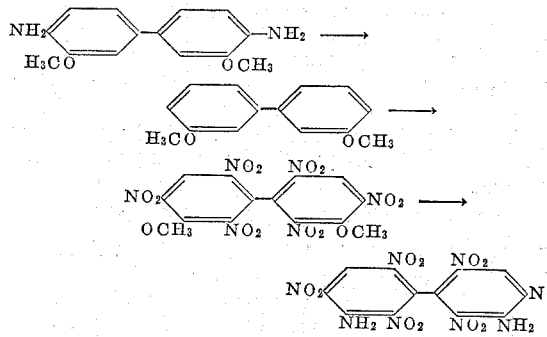

The improved results of this process are due mainly to the novel method for producing 3,3'-dimethoxy 2,2',4,4',-6,6' - hexanitrobiphenyl which generally comprises nitrating a solution of dimethoxybiphenyl with a mixture of oleum and nitric acid.

The solution of dimethoxybiphenyl (the solvent generally used is one that distills off at a temperature below the temperature of nitration; preferably a halohydrocarbon such as methylene chloride, chloroform and the like) is mixed with the oleum and nitric acid at a low temperature (usually below about 15° C. but with slow mixing it may be performed at temperature as high as room temperature) in order to prevent a self-sustaining exothermic reaction which results in a fume-off. The oleum is added to react with any water that is either in the nitric acid initially added or produced by the nitration and thus should be present in an amount sufficient to maintain anhydrous conditions. The amount of nitric acid present should be at least stoichiometrically sufficient to nitrate the dimethoxybiphenyl to 3,3'-dimethoxy-2,2', 4,4',6,6'-hexanitrobiphenyl, with at least 10 moles of nitric acid per mole of dimethoxybiphenyl being preferred.

After the mixing is complete the mixture is stirred at a temperature between 15° and 40° C., with 25–35° C. being preferred, until an appreciable amount of solid material precipitates (about 30–60 minutes). The mixture is then heated (heating before precipitation may result in a fume-off) with constant stirring to a temperature between 80° C. and 90° C. to produce the hexanitro derivative. This temperature is carefully regulated because at lower temperatures an excessive amount of the pentanitro derivative which is difficult to separate is formed and at higher temperatures there is a danger of a self-sustained thermal decomposition resulting from the oxidation of the methoxy groups. These temperature conditions are maintained (usually about 5–8 hours) until the insoluble material markedly changes in appearance; the wheat grain-like particles being replaced by finer particles.

The reaction mixture formed under the above conditions is cooled, filtered and the recovered solid particles (3,3'-dimethoxy - 2,2',4,4',6,6' - hexanitrobiphenyl) are washed with sulfuric acid and water. The crude product may be further purified by dissolving it in toluene, filtering the solution while hot, adding methanol, filtering the mixture and washing the solid additional methanol.

AMINATION

The resulting crude of purified 3,3'-dimethoxy-2,2',4,4',6,6'-hexanitrobiphenyl may then be converted to DIPAM by the amination procedure disclosed in application Ser. No. 371,139 filed by Oesterling, Dacons and Kaplan on May 28, 1964. It is to be understood, however, that the purified 3,3'-dimethoxy-2,2',4,4',6,6'-hexanitrobiphenyl produces a higher grade of DIPAM. (If the crude material is used the DIPAM after recrystallization melts at 304 °C. while the purified material produces DIPAM which melts at 305° C.) The amination is accomplished by bubbling dry gaseous ammonia into an alcoholic solution of dimethoxybiphenyl. Alternatively, one may emanate in either tetrahydrofuran-alcohol, toluene-tetrahydrofuran-alcohol or xylene-tetrahydrofuran-alcohol solutions. It is to be noted that each solvent in the latter two diluent systems plays an unique role in the amination process. Thus, the alcohol increases the capacity of the solutions for ammonia and the tetrahydrofuran increases the capacity of the solutions for dimethoxyhexanitrobiphenyl and DIPAM, thus tending to keep the reaction homogenous. The toluene and xylene, in which DIPAM is insoluble, tend to enhance the complete recovery of the product as the solutions are concentrated following amination.

THE PRODUCT OF DIMETHOXYBIPHENYL

The dimethoxybiphenyl used in the preparation of the dimethoxyhexanitrobiphenyl may be prepared by deaminating o-dianisidine by a modification of the procedure disclosed by Kornblum in "Organic Synthesis," vol. 21, pages 30–35 N. L. Drake Editor, John Wiley and Sons, New York, 1941; which is hereby incorporated by reference. This modified procedure generally involves preparing a solution of o-dianisidine in hydrochloric acid, adding sodium nitrite, and filtering the resulting mixture. This is followed by adding the filtrate to a hypophosphorous acid solution, extracting the mixture, washing with sodium hydroxide, drying, and purification by adsorption with alumina. The modifications made are the substitution of alumina adsorption for fractional distillation and the use of a lower concentration of hypophosphorous acid. The use of a lower concentration of acid reduces the cost of the process without affecting the reaction and the use of an alumina purification allows a simpler reaction technique. Although this purification results in a product of lower purity, it still produces a good grade of dimethoxyhexanitrobiphenyl, probably due to the destruction of the impurities during the nitration process.

The manner of carrying out the process of this invention will be further apparent from the following illustrative examples, it being understood that the scope of the invention is not to be limited thereby.

*Example I.—3,3'-dimethoxybiphenyl*

The method is a modification of a procedure by Kornblum as noted above. A solution of 800 ml. of water and 124 ml. of concentrated hydrochloric acid was placed in a two liter beaker. The solution was heated to boiling, 160 g. of o-dianisidine (Eastman Organic Chemicals, F509) were added and the mixture stirred for several minutes. The mixture was cooled with stirring to about 15° C., a further 140 ml. of concentrated hydrochloric acid was added and the mixture was further cooled to 8° to 10° C. A solution of 92 g. of sodium nitrite (J. T. Baker 3780) in 200 ml. of water was then added dropwise over a half hour; the temperature being held below 10° C. by continued cooling and stirring. The reaction mixture was held at 5° to 10° for a further twenty minutes, then filtered rapidly through a coarse sintered glass funnel. A small amount of gray insoluble material (Ca. 2–3 g.) was discarded.

The cold clear red filtrate was poured rapidly into 800 ml. of vigorously stirred ice-cold 50% $H_3PO_2$ (J. T. Baker 0178) in a three liter flask in an ice bath. Immediate and vigorous evolution of nitrogen occurred and there was an exotherm to 30–45° C. Cooling and stirring was continued for several hours and the mixture was set in the refrigerator overnight.

The green-black reaction mixture containing partially crystallized product was then extracted successively with one 400 ml. and two 100 ml. portions of chloroform, the combined chloroform extracts were washed with two 200 ml. portions of 10% NaOH solution, the alkali washes were reextracted with 100 ml. chloroform and the combined chloroform solutions were washed with 200 ml. water.

The wet chloroform solution was concentrated on the steam bath to pot temperature 80° C., 400 ml. of hexane was added, the solution again concentrated to pot temperature 80° C. and a further 800 ml. of hexane added. To the deep red solution there was added 200 g. of alumina (adsorption alumina, Fisher A–540); the mixture stirred for one half hour and filtered through a coarse sintered glass funnel containing a quarter inch thick layer of fresh alumina. The color of the effluent solution was yellow-orange to orange. The filter cake was washed with a further 200 ml. of hexane.

The hexane solution was concentrated in the steam bath to a volume Ca. 250 ml., then evaporated in a steam of dry air to yield 111 g. (79%) of 3,3'-dimethoxybiphenyl as chunky yellow to yellow-orange crystals, M.P. 41–42° C.

*Example II.—3,3'-dimethoxy-2,2',4,4',6,6'-hexanitrobiphenyl*

To a solution of 375 ml. of 90% nitric acid in 1200 ml. of 30% oleum in a creased 30 liter flask fitted for efficient stirring there was added dropwise a solution of 64.2 g. (0.30 mole) of 3,3'-dimethoxybiphenyl in 120 ml. of chloroform. The temperature was maintained below 12° C. by means of an ice-bath; the addition required 30 to 45 minutes. The color of the reaction mixture at this stage was dark brown, but the impurities were evidently oxidized out during later stages of the reaction as evidenced by the clear yellow color of the mother liquid after filtration of the product. The reaction mixture was allowed to warm to room temperature over a thirty minute period and stirred at room temperature until an appreciable amount of a solid material precipitated. This required thirty to sixty minutes.

The well stirred mixture was heated to 82–84° C. over a one hour period. At about 62° C. chloroform began to boil off and there was some foaming, but with reasonably adequate stirring the foaming presented no problem as long as sufficient free-space was maintained above the reaction mixture (for this reason a 3 liter flask was used for about 1800 ml. of total reaction volume). The reaction mixture was then stirred at 82–84° C. for six hours during which time the insoluble material markedly changed in appearance, the wheat grain-like particles being replaced by finer particles.

The reaction mixture was then cooled to 10° C. and filtered on a sintered glass funnel. The filtration was somewhat slow due to the fine nature of the precipitate, but not excessively so. Since the product floats to the top of the reaction mixture, very little was lost if most of this liquid was drained off prior to filtration. The mother liquor was clear and lemon yellow in color. Direct filtration of the reaction mixture rather than drowning on ice was preferred because the product seemed quite insoluble in the oleum nitric acid and drowning seemed to bring down some phenolic impurity. The product was then washed with 500 ml. of 50% sulfuric acid followed by four to six liters of water. The product was pale chartreuse in color and turned light tan on overnight drying at 120° C. The yield of crude dimethoxyhexanitrobiphenyl, M.P. 204–207° C., mixture M.P. with authentic sample 208–210° C., was 126.2 g. (86.9%). (Dimethoxypentanitrobiphenyl exists in two polymorphic forms, one of which melts at 214–215° C. Since this is the main impurity in the product and may indeed be the major component if nitration is not carried far enough, it is possible to be confused if mixture melting points are not taken with every melting point.)

For purification, 120 g. of crude dimethoxyhexanitrobiphenyl was dissolved in 1400 ml. of boiling toluene, the solution filtered hot and concentrated to a volume of about 300 ml. with stirring. To this hot solution was added 1400 ml. of methanol; the mixture was stirred a further half-hour, cooled and filtered, and the product washed with several hundred milliliters of methanol. After drying in the oven at 120° C., the pale tan granular product obtained by this procedure weighed 96 g. (80% recrystallization yield, 69.5% yield from dimethoxybiphenyl), and melted at 210–212° C., no depression with authentic sample. It seems likely that the overall yield may be increased by recovering impure dimethoxyhexanitrobiphenyl, strongly contaminated with the pentanitro derivative from the recrystallization mother liquors, and renitrating.

*Example III.—Preparation of DIPAM*

To the product obtained from Example II, there was added 300 ml. of tetrahydrofuran and 600 ml. of absolute methanol. The solution was then saturated with anhydrous ammonia and evaporated on the steam bath, while stirring slowly, until mass precipitation had occurred and the vapors were slightly alkaline. The slurry was then cooled to 10° C., filtered and washed thoroughly with cold methanol. On drying in the oven at 110° C., bright yellow DIPAM M.P. 305° C. was obtained in 91% yield.

Recrystallization was effected by dissolving the impure DIPAM in 775 ml. of hot tetrahydrofuran and then treating it while hot with Darco G-60 (a decolorizing carbon manufactured by Atlas Chemical Ind., Wilmington, Del.). The solution was filtered, the filtrate transferred to a three liter Ehrlenmeyer flask and 600 ml. of toluene added. The solution was then boiled at a moderate rate on the steam bath with slow stirring until the temperature of the escaping vapors was 95° C. and massive crystallization had occurred. The mixture was filtered while warm and the product washed thoroughly with cold toluene. On drying in the oven at 110° C. bright yellow crystalline DIPAM M.P. 305° C. was recovered (yield 96%). Based on o-dianisidine, the overall yield of recrystallized DIPAM was 48%.

*Example IV*

In an attempt to cut down the amount of nitrating mixture and to increase effective reactor capacity, a nitration was carried out using the following amounts and conditions; dimethoxybiphenol, 64.2 g.; chloroform, 120 ml.; 90% nitric acid, 190 ml.; 30% oleum, 600 ml.; seven hours at 83–84° C. Product, M.P. 198–202° C. was obtained in 85% yield; recrystallized product, M.P. 210–212° C. in 65.4% overall yield. The crude material on amination gave 78.4% DIPAM, M.P. 302.5° C.; the recrystallized product on amination gave 90% DIPAM, M.P. 304° C. Foaming was slightly more of a problem, but this could readily be handled with effective stirring during the nitration step.

The process of this invention for producing DIPAM has the following advantages over the previous process:

(1) The overall cost is reduced due to the lower cost of the starting material, o-dianisidine.

(2) The DIPAM produced is of a higher grade in that it melts one degree higher.

(3) The difficulties inherent in an Ullman reaction are avoided.

The DIPAM produced by this invention is a thermally stable explosive that has many applications, e.g. as a mild detonating fuse.

Obviously, many modifications and variations of the present invention are possible in the light of the above teachings. It is therefore to be understood that, within the scope of the appended claims, the invention may be practiced otherwise than as specifically described.

What is claimed is:

1. The process for producing 3,3'dimethoxy-2,2',4,4',-6,6'-hexanitrobiphenyl which comprises producing said 3,3'-dimethoxy-2,2',4,4',6,6'-hexanitrobiphenyl at a temperature between about 80° C. and 90° C. by nitrating a solution of 3,3'-dimethoxybiphenyl with a mixture of nitric acid and oleum, said nitric acid being present in an amount that is at least stoichiometrically sufficient to nitrate said 3,3'-dimethoxybiphenyl to 3,3'-dimethoxy-2,2',-4,4',6,6'-hexanitrobiphenyl and said oleum being present in an amount sufficient to maintain the reaction mixture substantially anhydrous.

2. The process for producing 3,3'-dimethoxy-2,2',4,4',-6,6'-hexanitrobiphenyl which comprises:

(a) mixing a solution of 3,3'-dimethoxybiphenyl with nitric acid and oleum, said nitric acid being present in an amount that is at least stoichiometrically sufficient to nitrate said 3,3'-dimethoxybiphenyl to 3,3'-dimethoxy-2,2',4,4',6,6'-hexanitrobiphenyl and said oleum being present in an amount sufficient to maintain the reaction mixture substantially anhydrous;

(b) maintaining the mixture at a temperature between about 15° and 40° C. until an appreciable amount of solid material precipitates; and (c) raising the temperature to between about 80° and 90° C. to produce said 3,3'-dimethoxy-2,2',4,4',6,6'-hexanitrobiphenyl.

3. The process of claim 2 wherein the mixing of step (a) is performed at a temperature below about 15° C.

4. The process of claim 3 wherein the temperature of step (b) is maintained between about 25° and 35° C.

5. The process of claim 4 wherein the temperature of step (c) is maintained for about 5 to 8 hours.

6. A process for producing 3,3'-diamino-2,2',4,4',6,6'-hexanitrobiphenyl which comprises:

(a) mixing a solution of the 3,3'-dimethoxybiphenyl with nitric acid and oleum, said nitric acid being present in an amount that is at least stoichiometrically sufficient to convert 3,3'-dimethoxybiphenyl to 3,3'-dimethoxy-2,2',4,4',6,6'-hexanitrobiphenyl and said oleum being present in an amount sufficient to maintain the reaction mixture substantially anhydrous;

(b) raising the temperature of the mixture to between about 80° C. and 90° C. to produce 3,3'-dimethoxy-2,2',4,4',6,6'-hexanitrobiphenyl; and (c) aminating the 3,3'-dimethoxy-2,2',4,4',6,6'-hexanitrobiphenyl to 3,3'-diamino-2,2',4,4',6,6'-hexanitrobiphenyl.

7. The process of claim 6 wherein the amination is effected by introducing ammonia to an alcoholic solution of the 3,3'-dimethoxy-2,2',4,4',6,6'-hexanitrobiphenyl.

8. The process of claim 6 wherein the solution comprises 3,3'-dimethoxy-2,2',4,4',6,6'-hexanitrobiphenyl and a solvent selected from the group consisting of methanol, tetrahydrofuran, methanol-tetrahydrofuran, toluene-methanol-tetrahydrofuran and xylene-methanol-tetrahydrofuran.

9. The process of claim 6 wherein the 3,3'-dimethoxybiphenyl is prepared by deamination of o-dianisidine by reacting o-dianisidine with hydrochloric acid and sodium nitrite and subsequently reacting the resulting product with hypophosphorous acid.

References Cited by the Examiner

UNITED STATES PATENTS 2,596,108  5/1952  Treves _____ 260—488

CHARLES B. PARKER, *Primary Examiner.*

BENJAMIN R. PADGETT, *Examiner.*

L. A. SEBASTIAN, NELSON WICZER,
*Assistant Examiners.*